(12) United States Patent
Susini

(10) Patent No.: US 6,405,938 B1
(45) Date of Patent: Jun. 18, 2002

(54) TUBULAR ELEMENT FOR LIQUID DRAWING AND METHOD FOR MAKING THE SAME

(75) Inventor: Etienne Susini, Villecresnes (FR)

(73) Assignee: Walk Pak Holding NV, Curacao (AN)

( * ) Notice: Subject to any disclaimer, the term of this patent is extended or adjusted under 35 U.S.C. 154(b) by 0 days.

(21) Appl. No.: 09/619,383

(22) Filed: Jul. 19, 2000

Related U.S. Application Data

(63) Continuation of application No. PCT/IB99/00128, filed on Jan. 26, 1999.

(30) Foreign Application Priority Data

Jan. 27, 1998 (EP) .............................................. 98420015

(51) Int. Cl.$^7$ ............................................... A47G 21/18
(52) U.S. Cl. ........................... 239/33; 239/24; 222/211; 220/703; 215/388; 229/103.1
(58) Field of Search ............. 239/24, 33; 220/703–719; 215/387–389, 229; 229/103.1; D7/300.2; 426/85; 264/322, 296, 320; 222/211

(56) References Cited

U.S. PATENT DOCUMENTS

| 2,269,593 A | 1/1942 | Maltby |
| 5,114,074 A | 5/1992 | Frauenthal |

FOREIGN PATENT DOCUMENTS

| DE | 297 10 651 | 10/1997 |

OTHER PUBLICATIONS

Patent Abstracts of Japan, vol. 097, No. 006, Jun. 30, 1997 & JP 09 039089 A (Toyo Cap KK), voir abrege.
Patent Abstracts of Japan, vol. 007, No. 001 (M–183), Jan. 6, 1983 & JP 57 160620 A (Takeuchi Press Kogyo KK), Oct. 4, 1982 voir abrege.
Patent Abstracts of Japan, vol. 011, No. 155 (M–589), May 20, 1987 & JP 61 286114 A (Showa Denko KK), voir abrege.

*Primary Examiner*—William C. Doerrler
*Assistant Examiner*—Dinh Q. Nguyen
(74) *Attorney, Agent, or Firm*—Henderson & Sturm LLP

(57) ABSTRACT

A tubular element for drawing liquid from a container is shown including a first end designed to be connected to a source of vacuum and a second end designed to be immersed in the liquid to be drawn. The tubular element is designed to pass through an orifice or an inlet conduit, made from an elastically extendable materia. The cross section of the tubular element is sized to be contiguous with the edge of the orifice or with the wall of the conduit. The tubular element also includes an annular bulge with a truncated cone shaped surface which includes a small base, which is directed towards the second end and has a diameter substantially equal to the external diameter of the said tubular element and which also includes a large base which with the external surface of the tubular element, defines a bearing surface and serves as an end stop with the conduit wall or the aperture of said container. The suction orifice of the second end of the tubular element is made through the small base of the truncated cone shaped surface of the annular bulge and forms a plane substantially perpendicular to the longitudinal axis of the tubular element.

4 Claims, 1 Drawing Sheet

TUBULAR ELEMENT FOR LIQUID DRAWING AND METHOD FOR MAKING THE SAME

CROSS-REFERENCE TO RELATED APPLICATIONS

This application is a continuation of PCT/IB99/00128 filed Jan. 26, 1999.

STATEMENT REGARDING FEDERALLY SPONSORED RESEARCH OR DEVELOPMENT

Not Applicable.

BACKGROUND OF THE INVENTION

1. Field of the Invention

The present invention relates to a tubular element for drawing liquid from a container by applying a vacuum at one of its ends, designed to pass through an orifice or an elastically extendable inlet conduit of the said container, the cross section of this tubular element being sized to be contiguous with the edge of this orifice or with the wall of this conduit which comprises means projecting from one portion of its outer tubular surface and shaped for allowing the said portion to pass through the said orifice or the said conduit from the outside towards the inside of the container and to counter its passage in the opposite direction.

2. Description of the Prior Art

There are a number of containers in existence, especially ones in the form of bags used most particularly for packaging drinks, designed to enable the drink to be consumed directly from the bag by sucking it up using a straw. These bags generally present a hygiene problem which results from the fact that the straw can be removed and replaced into the bag, so that there is a risk of the user introducing a dirty straw back into the wrapping. This risk is all the greater since the user is very often a child and even a very small child to whom the idea of hygiene could be very vague.

Furthermore, the end of the straw designed to be introduced into the bag is generally cut into a bevel thus making a pointed end, in order to perforate a closure designed to seal the bag before its first use. By allowing the free withdrawal of this straw from the bag, the user runs the risk of injuring himself with the bevelled end which is relatively hard and capable of puncturing. Once again, this risk is all the greater when the bag is in the hands of a young child.

A straw has already been proposed in DE 297 10 651 for drawing a drink from a container by sucking, having a bulge of which the cross section increases gradually and ends by returning suddenly to the initial section of the straw. In this way, the straw can be pushed through an orifice in the container, one of the elements (the orifice or the bulge) being elastically deformable, so that the front part of the bulge whose cross section increases gradually can pass through the orifice. The sudden narrowing of the bulge which is at the rear then prevents the straw from coming back out of the orifice. As the front end of such a straw is designed to be inserted through an orifice closed by a perforable closure, it has to be sharp, therefore bevelled, which means that if the straw is pulled out of the orifice, which is still possible, it remains dangerous.

Another solution fairly similar to the previous one was described in U.S. Pat. No. 5,114,074, and the same remarks as for the previous solution are applicable in this case.

Furthermore, when such a straw is used with a bag controlled by a valve formed by a channel made between two lines of welding joining two superposed films together, the cutting bevelled end of the straw inserted in this channel presents the risk of damaging this valve after repeated movements of insertion and withdrawal of the straw intended, respectively, to open and to close this valve.

BRIEF SUMMARY OF THE INVENTION

The object of the present invention is to remedy, at least in part, the aforementioned drawbacks and risks.

To this end, the subject of this invention is firstly a tubular element of the aforementioned type.

The subject of this invention is also a process or manufacturing this tubular element.

According to a preferred embodiment of the invention, the annular bulge is made from one portion of the end of the tubular element in a thermoformable material, turned back on itself towards the outside. The end with the truncated cone shaped outer surface is then formed on the end of this turned-back portion.

The end of the turned-back portion of the tubular element is brought back along the straw and forms an annular bearing surface on the outside of the tubular element, serving as a stop to stop this tubular element when there is a desire to withdraw its annular bulge from an orifice or from a conduit of a cross section corresponding to the normal cross section of this tubular element after having put it in through this orifice or this conduit. On the contrary, the truncated cone shaped portion formed at the front of this annular bulge enables a centrifugal force to be exerted on the edges of the orifice or the wall of the conduit made from an elastically extendable material in order to expand it and allow the insertion of the tubular element into the bag and allow this orifice or this conduit to close back up on this tubular element, after its bulge has passed through.

As may be realised, the preferred embodiment of the invention allows the provision of a means which effectively prevents the withdrawal of the tubular element, while at the same time solving the problem concerning the cutting end of the straw, since this cutting end is turned back on itself and since the new end is no longer bevelled and is therefore neither pointed nor cutting, the formation of the truncated cone shape by hot moulding of the turned-back part of the tubular element producing a blunt edge.

The appended drawing illustrates, schematically and by way of example, one embodiment of the tubular element, that is the subject of the present invention, and one embodiment of its process of manufacture.

DETAILED DESCRIPTION OF THE INVENTION

Figure 1:
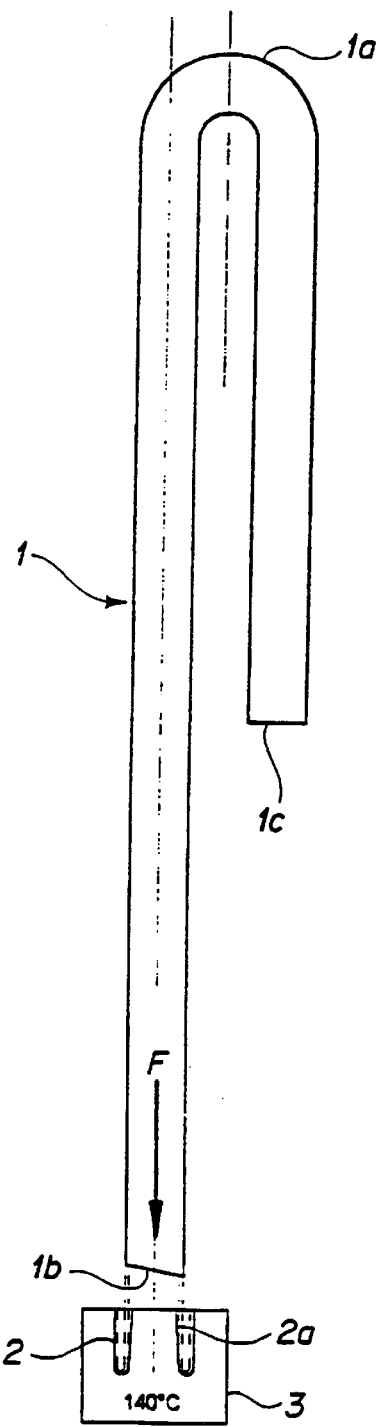
FIG. 1 is a view in elevation with partial section showing a first phase of the process.
Figure 2:
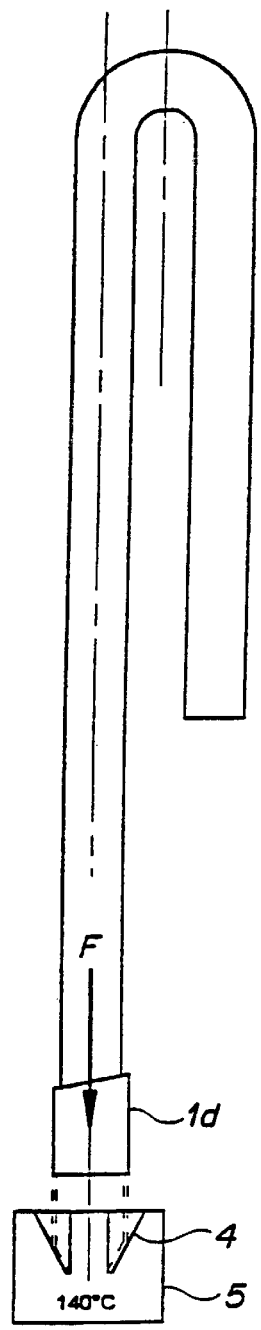
FIG. 2 is a view similar to FIG. 1 showing the second phase of the process.

The tubular element shown in FIG. 1 is a straw 1, made of polypropylene in this example, such as can be found commercially, having a segment 1a in which a bellows is formed by the formation of concertina folds to enable the straw to be bent at this location. One end 1b of the straw 1, cut into a bevel shape, is its suction end normally designed to be introduced into a packaging container for a drink. However, it can be made clear that this bevel is not needed in the case of the present invention. However, since this type of straw is generally available in this form, we wish to show that the present invention does not require modification of this type of straw. The other end 1c of this straw 1, through which the liquid is sucked, is the end for distributing the liquid contained in the container.

To form the tubular conduit that is the subject of the present invention, the bevelled end 1b is inserted into an annular imprint 2 of a first mould 3 heated, in the case of the polypropylene used in this example, to the softening temperature of this material which is located at around 140° C. This imprint has a rounded bottom and a width slightly greater than twice the thickness of the wall of the straw 1. The annular internal surface 2a of this imprint 2 is very slightly tapered, the smallest diameter being towards the open end of the imprint 2 and corresponding to the internal diameter of the straw 1.

By introducing the end 1b of the straw 1 into this annular imprint 2 and by exerting a slight axial pressure on the straw in the direction of the arrow F, the polypropylene softens and gradually turns back towards the outside into the shape of the imprint 2. As soon as the turned-back part of the straw 1, forming an annular bulge 1d, has reached the required length, the straw 1 is withdrawn from the imprint 2. It is then seen that the suction orifice formed from the suction end 1b is in a plane substantially perpendicular to the axis of the straw 1. Not only is the straw made less cutting through turning back the material at its end, but the fact that it is no longer bevelled also reduces potential danger still further.

We then move one to the second step of the process which consists in inserting the end of the straw 1 having the annular bulge 1d into a second imprint 4 of a second mould 5, heated to 140° C. The shape of this second annular imprint 4 is formed by an internal cylindrical surface whose diameter corresponds to the internal diameter of the straw 1 and by an external truncated cone shaped surface whose small base has, preferably, a diameter very slightly greater than the internal diameter of the straw 1 by a value corresponding approximately to the thickness of the wall of the straw 1.

Figure 3:
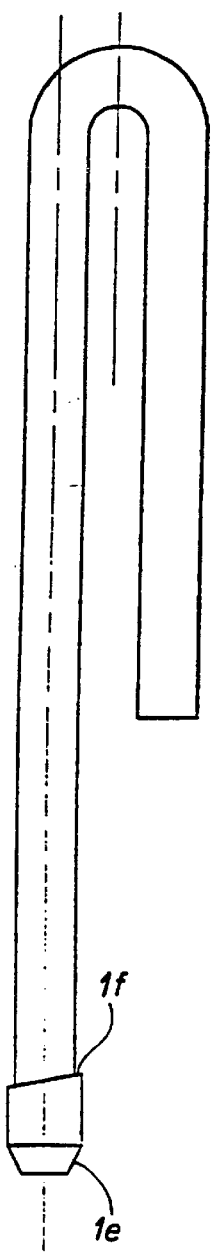
FIG. 3 is a view in elevation of the tubular element obtained by this process.

By inserting the end of the annular bulge 1d of the straw 1 into this second annular imprint 4 and by exerting a light pressure in the direction of the arrow F, a truncated cone shaped part 1e is formed at the front end of the annular bulge 1d (FIG. 3). The rear part of the annular bulge 1d formed by the turned-back end of the straw 1, forms a rear bearing surface 1f between the annular bulge 1d and the straw 1. This bearing surface serves as a stop designed to prevent the straw 1 from being taken back out after its been put in through an orifice or a conduit sized for the cross section of the straw 1 and made from an elastically extendable material. On the other hand, the truncated cone shaped part 1e made at the front end of the bulge 1d enables the material of the orifice or of the calibrated conduit controlling entry to the recipient to be dilated. Of course, the material from which this orifice or this passage is formed must have enough elasticity to allow this elastic dilation, so that it closes back up after passage of the bulge 1c and prevents it from coming out again. This material may advantageously be based on polyethylene.

By way of an example, a straw according to the present invention was inserted into a bag containing 0.5 liters of water and made to penetrate 5 cm beyond the orifice or the calibrated passage. The straw was held vertically and the bag was then released. The bulge 1d enabled the bag to stay on.

Of course, other embodiments can be imagined for achieving the same result, that is to say for allowing the insertion of the straw in one direction through an orifice or a passage sized to the diameter of the straw, but preventing it from passing through this same orifice in the other direction.

Hence it is possible to imagine the use of elastic tongues distributed at angles around the straw and made by cutting the wall of the straw then deforming them by heating. Such solutions have been studied but are not considered as the most attractive, with regard both to their effectiveness and to their manufacturing costs.

The process of manufacture described is really simple and quick to implement. Furthermore, the method of implementation described makes it possible, as has been seen, not only to solve the problem of holding a bag filled with 0.5 liters of water, but also to remove the risks of injury presented by bevelled straws. As a result, even if the straw is taken out, for example once the container is empty, by pulling very sharply or by cutting the bag, there is no risk of being injured with the end of the straw which was inside the bag.

What is claimed is:

1. A tubular element for drawing liquid from a container, comprising, a first end designed to be connected to a source of vacuum and a second end designed to be immersed in the liquid to be drawn, said tubular element being designed to pass through an orifice or an inlet conduit, made from elastically extendable material, of said container, wherein the cross section of said tubular element being sized to be contiguous with the edge of said orifice or with the wall of said conduit, said tubular element includes an annular bulge with a truncated cone shaped surface wherein a small base, which is downwardly directed towards the second end, has a diameter substantially equal to the external diameter of said tubular element and wherein the diameter of a large base and the external surface of the tubular element define a bearing surface, serving as an end stop with the conduit wall or the aperture of said container, wherein the suction orifice of said second end of the tubular element is made through the small base of said truncated cone shaped surface of said annular bulge and forms a plane substantially perpendicular to the longitudinal axis of said tubular element.

2. The tubular element according to claim 1, wherein said element is made from a thermoformable material in which said annular bulge is made by turning a portion of the orifice at the suction end back on itself.

3. The tubular element according to claim 2, wherein a cylindrical segment is formed between the larger base of said truncated cone shaped part and said bearing surface serving as an end stop.

4. The tubular element according to claim 1, wherein a cylindrical segment is formed between the larger base of said truncated cone shaped part and said bearing surface serving as an end stop.

* * * * *